United States Patent [19]

Charnley et al.

[11] Patent Number: 4,853,176
[45] Date of Patent: Aug. 1, 1989

[54] HAFNIUM STAINLESS STEEL ABSORBER ROD FOR CONTROL ROD

[75] Inventors: James E. Charnley, Gilroy; James E. Cearley, San Jose; Robert C. Dixon, Morgan Hill; Kenneth R. Izzo, San Jose, all of Calif.; Louis L. Aiello, Castle Hayne, N.C.

[73] Assignee: General Electric Company, San Jose, Calif.

[21] Appl. No.: 215,188

[22] Filed: Jul. 5, 1988

[51] Int. Cl.$^4$ .............................................. G21C 7/10
[52] U.S. Cl. ................................... 376/333; 376/327; 376/900
[58] Field of Search .................... 376/327, 333, 900

[56] References Cited

U.S. PATENT DOCUMENTS 4,655,999 4/1987 Maruyama et al. .................. 376/333
4,676,948 6/1987 Cearley et al. ...................... 376/333

*Primary Examiner*—Harvey E. Behrend
*Attorney, Agent, or Firm*—Robert R. Schroeder

[57] ABSTRACT

In a control rod construction for moderating and controlling a reaction of a nuclear reactor, a control rod structure is disclosed in which hafnium is welded to stainless steel. Typically, the control rod is confined for movement axially along its length into and out of the reactor. The hafnium is surrounded in the control rod structure by a sheath of stainless steel to inhibit movement relative to the control rod structure other than in the axial direction of control rod movement. The hafnium is friction welded to the stainless steel of the control rod so as to stress the weld in either tension or compression due to dynamic loading occurring from control rod movement. The stainless steel to which the hafnium is welded is in turn conventionally welded or mechanically connected to the remaining steel components of the control rod. There results a secure control rod structure having welded hafnium that can withstand the dynamic loadings of fast insertion of control rods such as those loadings which commonly occur under rapid control rod acceleration and deceleration due to SCRAM of a reactor.

8 Claims, 2 Drawing Sheets

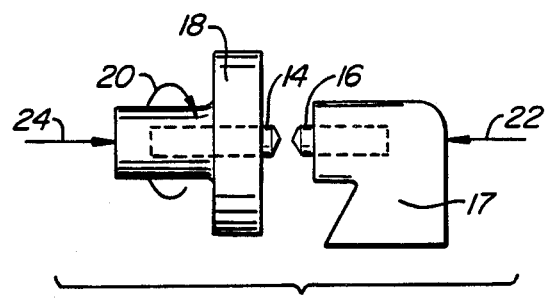
FIG._1A.
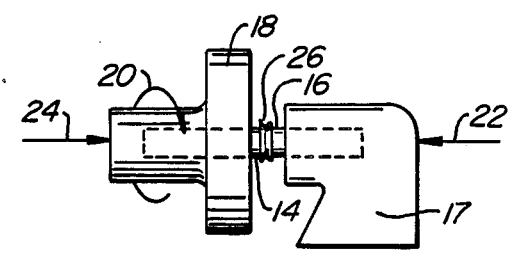
FIG._1B.
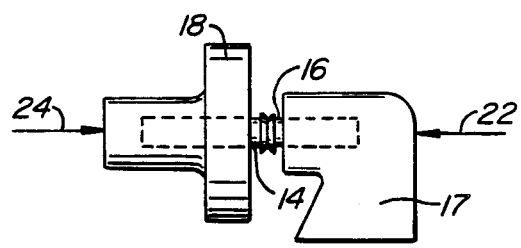
FIG._1C.

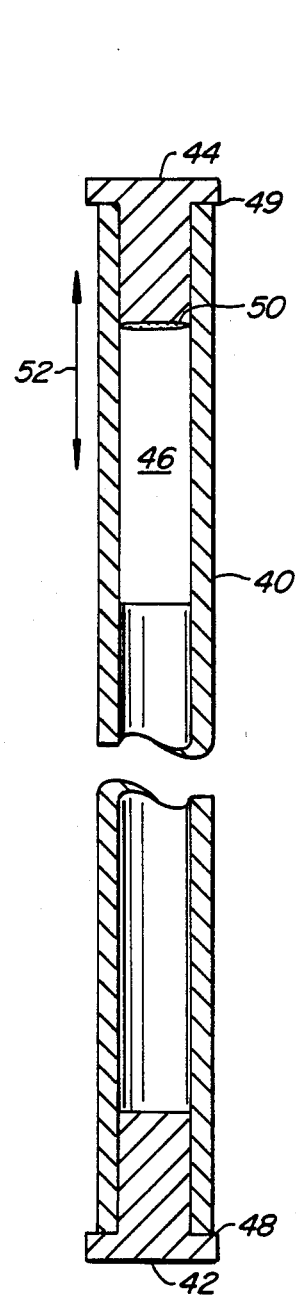
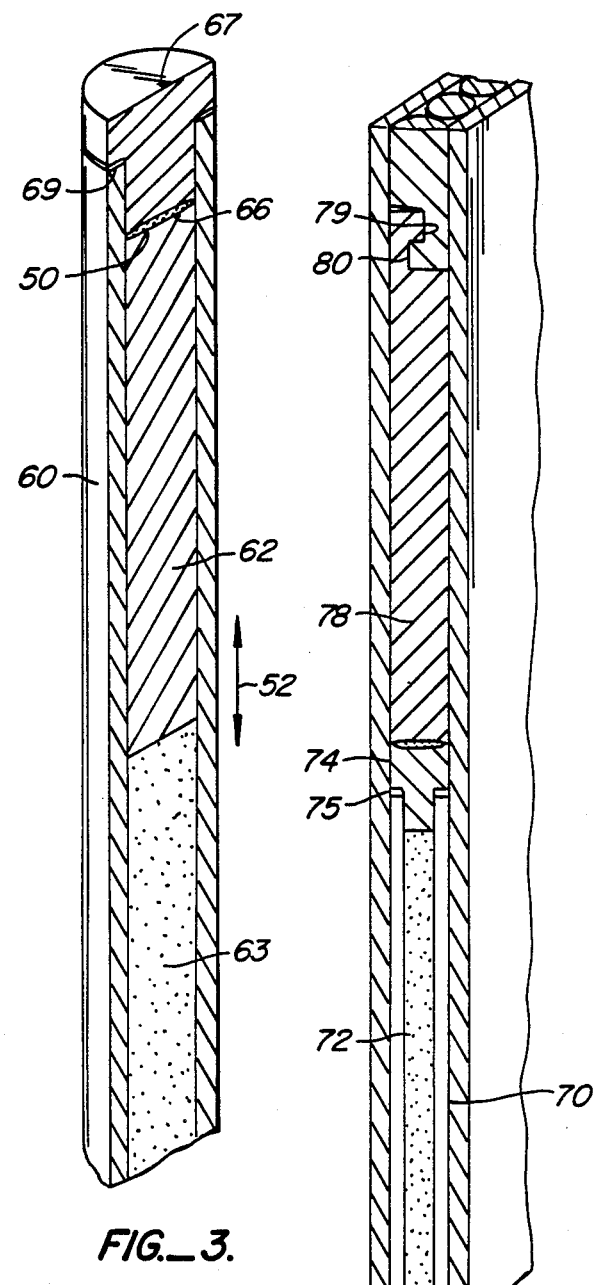
FIG._2.
FIG._3.
FIG._4.

HAFNIUM STAINLESS STEEL ABSORBER ROD FOR CONTROL ROD

BACKGROUND OF THE INVENTION

This invention related to control rods utilized with nuclear reactors. Specifically, a control rod construction is utilized in which hafnium is friction welded to stainless steel in a control rod construction where the weld is stressed in tension or compression only by the dynamics of control rod movement.

SUMMARY OF THE PRIOR ART

Hafnium is a metallic element of atomic number 72 having a high specific gravity (13.1) and an extremely high thermal neutron corss-section (115 barns). Hafnium is commonly used in control rods for nuclear reactors in that it is a long lived neutron absorber.

Needless to say, hafnium is heavy. Its specific gravity of 13.1 is heavier than lead (specific gravity 11.35). While it is desirable from the neutron standpoint to include hafnium as part of the control rod of a nuclear reactor, hafnium is most undesirable as a portion of a control rod because of its weight and its inability to be joined intricately to the stainless steel of conventional control rods.

Stainless steel is the substance from which the structural components of most control rods are fabricated. Hafnium is not suited for conventional welding to stainless steel. In short, during the high heat of conventional welding in which the metals to be welded are heated to a molten state, hafnium forms a brittle intermetallic media with stainless steels. This brittle intermetallic lacks the ductility and general tension and compression properties required in welds.

Control rods are typically fabricated from stainless steel. The stainless steel is used to encase neutron absorbers, such as boron carbide ($B_4C$). The boron carbide is utilized for the control of nuclear reactions.

Unfortunately, when boron carbide undergoes decomposition due to the presence of high neutron flux and other radiation, gases are liberated. Typically, the control rods of nuclear reactors are subjected to simultaneous high heat and high pressure due to the gases created when boron carbide is subjected to radiation. Moreover, boron carbide is not a long lived absorber.

Adding hafnium tips as long lived absorbers to control rod having boron carbide absorbers is known. The hafnium tips provide the composite control rods with optimum life at reasonable cost.

Unfortunately, because of the inability of hafnium to be joined to stainless steel and because of its high density, the joining of hafnium to the otherwise stainless steel structure of control rods is difficult. This difficulty arises from the current practice of surrounding the hafnium with stainless steel for containment purposes.

When a nuclear reactor is SCRAMed, control rods are inserted on a relatively instantaneous basis. Control rods of length in the order of 12-feet are fully inserted within a reactor in less than 2 seconds Hafnium tips (specific gravity 13.1), being considerably more dense than the stainless steel (specific gravity 7.9), subject any containing stainless steel to dynamic loadings during changes of control rod acceleration.

By way of example, during initial accelerations, forces of up to 30 gravitational fields can be imposed. Upon full insertion of the control rod and sudden stopping against the reactor structure, forces up to at least 200 gravitational fields can be present. Therefore, virtually any freedom of contained hafnium to move relative to the containing stainless steel parts of a reactor control rod can cause breakage in the stainless steel control rod containment structure. This breakage can include rupture of the stainless steel tubing containing pressurized boron carbide. Any such breakage is an unacceptable result that can cause transport of radioactive particles throughout a nuclear reactor in the steam cycle.

So-called friction welding is known. Friction welding comprises relatively rotating and simultaneously forcing two pieces of metal together. The rotating and forcing is typically continued until friction causes plastic metallic flow extrusion of metal at the metallic interface between the two relatively rotating metals. As a part of such welding, plastic flow at the weld interface occurs. Hot material flows form the weld interface.

Upon extrusion of hot plastic metallic material out of the weld interface, the relative rotation between the two pieces to be welded is stopped. The force bringing the two pieces together is maintained. During the cooling process, welding occurs in the two joined materials.

It is not known to weld hafnium to stainless steel.

DISCOVERY

We are unaware of any attempt ever being made to weld hafnium to stainless steel. It is known that hafnium and stainless steel form a brittle intermetallic which has poor tension, compression, ductile and elastic properties.

We have discovered that the friction welding of hafnium to stainless steel produces a weld having high tensile strength. This weld, however, generally lacks accepted ductility for conventional weld stresses.

Utilizing this discovery, we confine hafnium within a control rod so that loadings experienced by the hafnium at the weld will be under tension or compression only. We, therefore, disclose for the first time a control rod structure for a nuclear reactor in which direct hafnium welds to stainless steel occur.

We suspect that the success of the disclosed welds is due to the presence of an extremely thin metallic bond between the hafnium and the stainless steel. This bond occurs at a relatively thin interface between the two metals. The process of friction welding of these two metals has been discovered by us to form a small thin intermetallic region having relatively high tensile strength.

SUMMARY OF THE INVENTION

In a control rod construction for moderating and controlling a reaction of a nuclear reactor, a control rod structure is disclosed in which hafnium is welded to stainless steel. Typically, the control rod is confined for movement axially along its length into and out of the reactor. The hafnium is surrounded in the control rod structure by a sheath of stainless steel to inhibit movement relative to the control rod structure other than in the axial direction of control rod movement. The hafnium is friction welded to the stainless steel of the control rod so as to stress the weld in either tension or compression due to dynamic loading occurring from control rod movement. The stainless steel to which the hafnium is welded is in turn conventionally welded or mechanically connected to the remaining steel components of the control rod. There results a secure control rod structure having welded hafnium that can withstand the dynamic loadings of fast insertion of control rods such as those loadings which commonly occur under rapid control rod acceleration and deceleration due to SCRAM of a reactor.

OTHER OBJECTS, FEATURES AND ADVANTAGES

An object of this invention is to disclose a nuclear absorber rod constructed by the welding of hafnium to stainless steel. Accordingly, a rod of hafnium, in the order of 3/16-inch diameter is relatively rotated with respect to a rod of stainless steel having approximately the same diameter. During the relative rotation, a force bringing the two pieces one toward another, is applied. The force of the rods towards one another is maintained until plastic flow occurs at the intended weld interface. An annulus of extruded plastic material forms about the relatively rotating pieces. When this annulus has formed, the relative rotation is stopped while the force of the two pieces is maintained one towards another. This force is maintained during the cooling which follows. It has been found that a weld between the two pieces occurs with a thin bimetallic interface.

An advantage of the described process is that it gives for the first time a positive welded connection of stainless steel and hafnium. This welded connection, while possessing low ductility, has relatively high tensile strength.

A further object is to disclose a friction weld utilized in a control rod. According to this aspect of the invention, the welded piece of hafnium is confined so as to be loaded in tension or compression upon dynamic movement of the control rod. This confinement is preferably accomplished by surrounding the hafnium with stainless steel so that the hafnium is only free in the direction of control rod movement.

The weld is placed relative to the confined hafnium so that it will only be subjected to tension or compression upon dynamic control rod movement. It is not oriented so that forces of shear or bending will be present on the weld.

An advantage of this aspect of the invention is that the relatively brittle but strong tensile friction weld of hafnium to stainless steel is oriented so that it may be utilized within a control rod structure.

BRIEF DESCRIPTION OF THE DRAWINGS

Other objects, features and advantages of this invention will become more apparent after referring to the following specification and attached drawings in which:

FIGS. 1A through 1C are a cartoon series of the process of producing a friction weld;

FIG. 2 is a side elevation section of a control rod absorber rod hollow cylinder having a hafnium plug held in the interior of the cylinder by the preferred apparatus and process of this invention;

FIG. 3 is an alternate embodiment of a hafnium plug inserted in a control rod; and, FIG. 4 is an alternate embodiment of hafnium being mounted to the tip of a control rod, the mechanism here illustrated including a mechanical lock between the upper and lower portions of the control rod.

FIG. 1A is a schematic illustrating a rod of stainless steel 14 being friction welded to a piece of hafnium 16. Stainless steel rod 14 is placed within a rotating chuck 18 which rotates in the direction of arrow 20. Hafnium rod 16 is held stationary in jig 17. During the relative rotation between the two members, a force (symbolized by vectors 22, 24) is placed across the weld interface.

Preferably, the dimensions of the two rods 14 and 16 between 0.12 to 0.30 of an inch in diameter. Relative rotation of the jig 18 relative to the stationary hafnium rod 16 occurs. The force between the jig and the rotating chuck is sufficient for an interface to form containing the bimetallic metal formed diffusion.

It is preferable to provide a point to each of the rods 14, 16. That is to say, the rods each have a conical surface. This conical surface is the point of first contact during the so-called "friction" weld.

Referring to FIG. 1B, relative rotation between the two rods 14, 16 has occurred until an annulus 26 develops between the two rods. This annulus comprises a layer of plastically flowing material. This plastically flowing material flows out of the interface between the two metals to expose unoxidized and pure metallic interfaces. This permits a clean weld to be made.

Referring to FIG. 1C, rotation of the chuck member 18 relative to the jig member 17 has ceased. At this point, there is no relative movement between rods 14, 16. At the same time, the force between rods 14, 16 is maintained. Due to the high heat present, a metallic bond is formed. This metallic bond consists of a narrow diffusion interface.

Examination of the resultant bond when hafnium and stainless steel are welded together has revealed that a relatively high tensile strength in the order exceeding 50,000 lbs./inch$^2$ is developed. The weld, however, lacks ductility. Specifically, when one of the two rods 14, 16 is held in a vise, it is possible to break the other rod free by bending at the weld.

Destructive testing of the weld illustrates that some of the welds are weaker in tensile strength than either of the component metals. Breakage occasionally occurs at the weld, revealing the thin metallic fusion bond there created. A tensile strength greater than 50,000 pounds per square inch is obtained.

The reader will understand that the friction weld herein illustrated is conventional—except for the specification of the two materials to be welded, stainless steel and hafnium.

Referring to FIG. 2, an absorber element of a control rod is illustrated. The element includes a stainless steel outer sheath tube 40 having a bottom end plug 42 and a top end plug 44. Top end plug 44 is friction welded to a rod of hafnium 46. Hafnium rod 46 is dimensioned to fit within the inside diameter of the stainless steel tube 40.

Sealing of the tube (shown broken away in FIG. 2) is easily understood. Both bottom plug 42 and top plug 44 are conventionally welded at respective welds 48 and 49 to the top and bottom of the tube.

The friction weld at 50 (constructed by the process of FIGS. 1A, 1C) forms a thin metallic bond or interface of welded material.

It will be understood that the axis of control rod movement is schematically illustrated in direction 52. Preferably, control rod insertion will be upward.

It will be seen that hafnium plug 46 is confined to exert a tension or compression force only on weld 50. Shear and/or bending will not be present on the weld 50. It is this ability to constrain the load on the resultant friction weld which allows its utility in the disclosed application.

It will be understood that the control rod structure here illustrated will admit of other embodiments.

Referring to FIG. 3, a control rod 60 is shown having a hafnium plug 62 at the end thereof. Welded by the friction welding process hereinbefore set forth at a weld interface 66. Welding again occurs by the process previously illustrated with respect to FIGS. 1A, 1C.

Cap 67 is welded to the exterior of the rod at welds 69. Thus, conventional boron carbide 63 is confined within the interior of the control rod.

Again, the movement of the control rod is constrained in the axial direction of the rod illustrated in FIG. 52. Therefore, hafnium plug 62 loads the weld 66 in either tension or compression. Bending or shear is not present at the weld interface 66 to an appreciable degree.

Finally, and referring to FIG. 4, an alternate embodiment is illustrated. Specifically, a stainless steel control rod 70 containing boron carbide 72 is capped at an end plug 74 by conventional stainless steel weld 75. The top of the end plug has previously been friction welded to a hafnium rod 78. Hafnium rod 78 has a connection 79 configured at the upper portion thereof. Connector 79 is configured with a mating L and 80 from the upper part of the control rod by the expedient of engaging respective opposing teeth 79, 80, a mechanical connection occurs at the top of hafnium rod 78.

It can thus be seen that the cross-section includes a hafnium rod 78 welded at one end to end plug 74 of the absorber rod and mechanically fastened at the opposite end of the control rod. Realizing that the hafnium is approximately twice the density of steel, the importance of maintaining the hafnium stationary with respect to the typically pressurized and very highly heated stainless steel rod containing boron carbide can be understood. Simply stated, if the hafnium is allowed to undergo appreciable relative movement, over stressing of the control rod can occur. Excessive over stressing can cause breakage which can include liberate particles of boron carbide or other neutron absorber materials within the water of a boiling water reactor with resultant contamination throughout the plant. Those having skill in the art will appreciate that there can be numerous other configurations of the weld herein illustrated. It is important that the weld hafnium and stainless steel be confined for loading in tension or compression only.

What is claimed is:

1. In a control rod having a stainless steel body for enclosing a neutron absorbing poison, said control rod having movement along an axial direction for insertion into and out of a nuclear reactor for controlling a nuclear reaction, the improvement comprising:
    a piece of hafnium;
    a piece of stainless steel joined to said hafnium by a thin diffusion interface created by friction welding;
    said hafnium and said stainless steel oriented serially in said axial direction with said thin diffusion interface disposed normal to the axial direction of said control rod movement;
    means for confining said hafnium to movement along said axial direction with said control rod; and
    means for attaching said piece of stainless steel to the remaining portion of said control rod to load the weld therebetween under compression or tension during said control rod movement whereby said thin diffusion interface is loaded in tension or compression only upon dynamic movement of said control rod.

2. A control rod according to claim 1 and wherein said means for attaching said piece of stainless steel to the remaining portion of said control rod comprises a conventional weld.

3. A control rod according to claim 1 and wherein said means for attaching said piece of stainless steel to the remaining portion of said control rod comprises mechanical attachment.

4. In a control rod for controlling a nuclear reaction by movement into and out of a nuclear reactor along an axis of movement, the control rod comprising;
    a stainless steel body having a hollow interior for containing neutron absorbing poisons for control of a nuclear reaction;
    neutron absorbing poisons contained within said stainless steel body;
    a piece of hafnium for joining to the stainless steel body of said control rod;
    a piece of stainless steel joined to said hafnium by a thin diffusion interface created by friction welding, said hafnium and said stainless steel oriented serially in said axial direction of control rod movement with said thin diffusion interface disposed normal to the axial direction of said control rod movement;
    means for confining said hafnium as attached to said piece of stainless steel to movement along the axial direction with said control rod whereby said thin diffusion interface is stressed in tension or compression only upon dynamic loading of said control rod by movement in said axial direction; and,
    means for attaching said piece of stainless steel to the remaining stainless steel portions of said control rod to load the weld therebetween under compression or tension during dynamic control rod movement.

5. The control rod according to claim 4 and wherein said means for attaching said piece of stainles steel to the remaining portion of said control rod comprises a welded connection.

6. The invention of claim 4 and wherein said means for attaching said piece of stainless steel to the remaining portion of said control rod comprises a weld.

7. The invention of claim 4 and wherein said means for confining said hafnium to movement along said axial direction with said control rod comprises a tube surrounding said piece of hafnium.

8. The invention of claim 7 and wherein said piece of hafnium is cylindrical and fits within said tube.

* * * * *